(12) United States Patent
Song et al.

(10) Patent No.: US 11,739,484 B2
(45) Date of Patent: Aug. 29, 2023

(54) SNOW SHOVEL STRUCTURE OF SNOW PLOW ROBOT

(71) Applicant: Dibi (Chongqing) Intelligent Technology Research Institute Co., Ltd., Chongqing (CN)

(72) Inventors: Yongduan Song, Chongqing (CN); Hong Long, Chongqing (CN); Fang Hu, Chongqing (CN); Jiangyu Wu, Chongqing (CN); Ziqiang Jiang, Chongqing (CN); Junfeng Lai, Chongqing (CN)

(73) Assignee: Dibi (Chongqing) Intelligent Technology Research Institute Co., Ltd., Chongqing (CN)

( * ) Notice: Subject to any disclaimer, the term of this patent is extended or adjusted under 35 U.S.C. 154(b) by 281 days.

(21) Appl. No.: 17/369,412

(22) Filed: Jul. 7, 2021

(65) Prior Publication Data
US 2022/0341109 A1     Oct. 27, 2022

(30) Foreign Application Priority Data
Apr. 26, 2021   (CN) .......................... 202120868277.1

(51) Int. Cl.
*E01H 5/06*    (2006.01)
*E01H 5/12*    (2006.01)
*F16H 37/06*   (2006.01)

(52) U.S. Cl.
CPC ................. *E01H 5/06* (2013.01); *E01H 5/12* (2013.01); *F16H 37/065* (2013.01)

(58) Field of Classification Search
CPC .................................... E01H 5/06; E01H 5/12
See application file for complete search history.

(56) References Cited

U.S. PATENT DOCUMENTS 10,049,278 B2 *   8/2018   Womble ................... A01K 1/01
10,788,837 B2 *   9/2020   Wilson ................. G05D 1/0219

FOREIGN PATENT DOCUMENTS

| CN | 108589601 A | * | 9/2018 | ............. A62C 27/00 |
| CN | 108855442 A | * | 11/2018 | ......... B02C 18/0084 |
| CN | 210031656 U | * | 2/2020 | |
| CN | 111036620 A | * | 4/2020 | |
| CN | 211571582 U | * | 9/2020 | |
| CN | 113005977 A | * | 6/2021 | |

* cited by examiner

*Primary Examiner* — Gary S Hartmann
(74) *Attorney, Agent, or Firm* — McCarter & English, LLP; Yu Lu

(57) ABSTRACT

A snow shovel structure of a snow plow robot. The snow shovel structure includes a housing where a snow shovel mechanism is. The snow shovel mechanism extends outside the housing and includes a first motor fixed on a top of the housing. The first motor is fixedly connected with a telescopic rod through an output shaft. A second motor is further provided on a top portion of an inner chamber of the housing, and a horizontal plate is fixedly arranged on a side wall of the inner chamber of the housing.

10 Claims, 5 Drawing Sheets

SNOW SHOVEL STRUCTURE OF SNOW PLOW ROBOT

CROSS REFERENCE TO RELATED APPLICATION

This patent application claims the benefit of and foreign priority to Chinese Patent Application No. 202120868277.1, filed on Apr. 26, 2021, the disclosure of which is incorporated by reference herein in its entirety as part of the present application.

TECHNICAL FIELD

The disclosure relates to the technical field of snow plow robots, and in particular to a snow shovel structure of the snow plow robot.

BACKGROUND ART

Robots are broadly defined as automated machines. A difference from those automated machines is that these robots have some intelligent abilities, such as perception, planning, movement, and coordination, similar to humans or creatures. So, the robots are automated machines with a high degree of flexibility. Robots can assist or even replace humans to complete dangerous, heavy and complex tasks, which improves the work efficiency and quality, serves human life, and expands and extends the scope of human activities and capabilities. Sweeping robots are common in life. This type of robot has functions that can assist people to sweep and clean. Snow plow robots are required when the snow is piled up on a road. This type of robot is also a kind of intelligent electrical devices, which can automatically complete the snow removal work on the road by virtue of a certain artificial intelligence itself, and use a snow shovel to shovel the snow to roadsides to ensure a normal passage of a main road.

There have been the following shortcomings in technologies: existing snow plow robots generally only push the snow to both sides of the road when performing snow removal on the road, to ensure the normal passage of the main road. However, due to the temperature in winter is high and then low, the snow piled up on the sides of the road may also melt into water, then flow to the center of the road, and thus freeze under the low temperature, which causes safety hazards to people passing on the road. And the traditional snow plow robots are difficult to remove the hard ice to complete the sweeping work when sweeping snow on an icy road.

Therefore, based on the above technical problems, it is necessary for those skilled in the art to develop a snow shovel structure of a snow plow robot.

SUMMARY OF THE INVENTION

In view of the above-mentioned problems existing in the prior art, the technical problem to be solved by the present disclosure is to make the device to perform the ice-breaking operation on icy segments of the road, and crack the hard ice to remove together, when the snow removal is performed on the snow-covered segments of the road.

In order to solve the above technical problems, the technical solution adopted by this disclosure is that:

A snow shovel structure of a snow plow robot, the snow shovel structure comprising a housing, wherein a snow shovel mechanism is provided inside the housing and extends out of the housing, The snow shovel mechanism includes a first motor fixed on a top portion of the housing and fixedly connected with a telescopic rod through an output shaft, a second motor is further provided on a top portion of an inner chamber of the housing, a horizontal plate is fixedly arranged on a side wall of the inner chamber of the housing, the second motor is fixedly arranged on a top portion of the horizontal plate and fixedly connected with a first rotating rod through an output shaft, the first rotating rod arranged on a rear side of the telescopic rod penetrates through the horizontal plate and is connected with the horizontal plate through a first bearing, the top portion of the housing is further fixedly provided with a battery arranged at a side of the first motor, the first motor and the second motor are electrically coupled with the battery, and a bottom portion of the housing is fixedly with four universal wheels.

The snow shovel mechanism further includes a protection component, the protection component includes a motor box fixedly arranged on the top portion of the housing, and the first motor is fixedly arranged inside the motor box.

In this disclosure, the battery supplies power for the first motor and the second motor. When the first motor is working, the first motor drives the telescopic rod to rotate. And the second motor is supported and positioned by the horizontal plate. When the second motor is working, the second motor drives the first rotating rod to rotate. Since the first rotating rod is provided behind the telescopic rod, the belt is not in contact with the telescopic rod when the belt between the telescopic rod and the fourth rotating rod is working, which causes the negative effects. The four universal wheels fixed in the bottom portion of the housing may move the housing flexibly, which is convenient for the device to shovel the snow piled up different road segments during moving.

A bottom portion of the inner chamber of the housing is provided with a reciprocating screw rod, the reciprocating screw rod arranged at a bottom portion of the first rotating rod is connected with the bottom portion of the inner chamber of the housing through a second bearing, the reciprocating screw rod and the first rotating rod are connected through a first one-way bearing, the reciprocating screw rod is sheathed at an outside thereof with a bearing seat connected to the reciprocating screw rod through a ball screw nut pair, and a support plate is fixed on a side of the bearing seat. The first rotating rod drives the reciprocating screw to rotate, the reciprocating screw drives the bearing seat to move up and down, and the bearing seat drives the support plate to move.

A first gear box is provided outside the telescopic rod; a top portion of the first gear box is connected to the telescopic rod through a third bearing, the first gear box is provided with a second rotating rod penetrating through and connected with the first gear box through a fourth bearing, a rear end of the second rotating rod is connected with the support plate through a sixth bearing; a first bevel gear is fixedly provided outside the telescopic rod, a second bevel gear is fixedly provided outside the second rotating rod; the second bevel gear is arranged at a bottom portion of the first bevel gear and meshed with the first bevel gear. The second bevel gear meshes with the first bevel gear, the telescopic rod drives the first bevel gear to rotate, the first bevel gear drives the second bevel gear to rotate, and the second bevel gear drives the second rotating rod to rotate.

A side portion of the housing which is opposite to the first side wall is opened with a movable groove, a second gear box is provided at the side portion of the housing, the side portion of the housing is further provided with two sliding grooves provided on a front side and a rear side of the movable groove respectively, two sliding blocks are fixedly arranged on a side of the second gear box which is close to the housing and arranged inside the two sliding grooves respectively, the second rotating rod penetrates through both the movable groove and a side wall of the second gear box, which is close to the housing and is connected with the side wall of the second gear box through a seventh bearing. The movable groove is provided between the two sliding grooves, so that the second rotating rod can move up and down through the movable grooves, and the sliding grooves and the sliding blocks interact to enable the second gear box to be limited while moving up and down.

A third rotating rod is provided inside the second gear box, a front side end and a rear side end of the third rotating rod are connected with a front side portion and a rear side portion of an inner chamber of the second gear box respectively through a eighth bearing and a ninth bearing, a third bevel gear is fixed outside the second rotating rod, a fourth bevel gear (18) is fixed outside the third rotating rod, and the fourth bevel gear is arranged on a side of the third bevel gear which is away from the housing and meshed with the third bevel gear. The second rotating rod drives the third bevel gear to rotate, the third bevel gear drives the fourth bevel gear to rotate, and the fourth bevel gear drives the third rotating rod to rotate.

A snow shovel plate is provided on a side of the second gear box which is away from the housing, a top portion and a bottom portion of the snow shovel plate are provided with cavities respectively, an ice-breaking frame is provided outside the second gear box, a side of the ice-breaking frame is opened with a through groove in which the second gear box is provided, a top portion and a bottom portion of the ice-breaking frame are both extended into the cavities and extended out of the cavities respectively, two springs are fixed on a side of the snow shovel plate which is close to the housing, and an end of each spring which is close to the housing is fixedly connected with a side wall of an inner chamber of the ice-breaking frame which is close to the housing. The ice-breaking frame can move left and right in the cavities, and the springs provide pulling and pushing forces when the ice-breaking frame moves left and right.

The second gear box is provided with an L-shaped groove, a side of the snow shovel plate which is close to the housing is fixedly provided with a connecting plate penetrating through the L-shaped groove and extending into the second gear box, and the third rotating rod penetrates through and is fixedly connected to the connecting plate. The L-shaped groove provides space for the rotation of the connecting plate, the third rotating rod drives the connecting plate to rotate, and the rotation of the connecting plate drives the snow shovel to rotate.

A box body is fixedly provided on a side of the housing which is opposite to the side wall fixed with the horizontal plate, a fourth rotating rod is provided in the housing, a top portion and a bottom portion of the fourth rotating rod are connected with a top portion and a bottom portion of the box body respectively through a tenth bearing and a eleventh bearing, two sides of the box body are provided with slots respectively, a circular plate is provided outside the fourth rotating rod, a plurality of beating plates are provided outside the circular plate, and a vertical plate is fixed on a top portion of the ice-breaking frame. The fourth rotating rod drives the circular plate to rotate, the circular plate drives multiple beating plates to rotate, and the beating plate beats the vertical plate, so that the vertical plate drives the ice-breaking frame to be beat, and combines the pulling and pushing forces of the spring to realize the beat on the ice and snow.

A first belt pulley is provided outside the first rotating rod, the first belt pulley is connected with the first rotating rod through a second one-way bearing, a second belt pulley is fixedly provided outside the fourth rotating rod, a belt is provided between the first belt pulley and the second belt pulley, and the first belt pulley and the second belt pulley are connected by the belt. The second belt pulley drives the fourth rotating rod to rotate, the first rotating rod drives the first belt pulley to rotate, the first belt pulley drives the belt to rotate, the belt drives the second belt pulley to rotate, and the second belt pulley drives the fourth rotating rod to rotate.

The protection component further includes a trapezoidal plate fixed on the top portion of the housing, and the first motor is fixedly arranged inside the trapezoidal plate. The trapezoidal plate provides protection for the motor. When the first motor is working, the trapezoidal plate provides protection for the first motor, and provides the good heat-dissipation space for the first motor.

Compared with the prior art, the embodiments have at least the following advantages.

1. Through the design of the snow shovel mechanism, when the device is used for performing the snow removal operation on snow-piled road, for the icy segments of road, the ice may be broke, and then the hard and frozen snow may be shoveled together after being cracked. The frozen snow may be thrown directly into the sewer or the green belt along roadsides due to the pollution-free nature of the frozen snow. The snow shovel plate is controlled to move up and down as well as to rotate up and down after the frozen snow is shoveled by this device, so as to pour the frozen snow into the green belt or the sewer to nourish plants in the green belt. In this way, it avoids a problem of safety risks in the traditional method that the frozen snow is directly piled up the roadsides, as well as flows back to the road and freezes again after melting.

2. Through a simple mechanism design, a difference between this device and the traditional snow plow robot in terms of the snow shoveling operation is that, the device may directly remove the shoveled snow to the green belt and the sewer, and for the icy road, after the ice may be beat and broke during the snow is shoveled, so that the snow removal work is more thorough. In addition, this simple mechanism design is easy to product and manufacture, and the economic cost of manufacturing is controlled reasonably, which is more suitable for large-scale promotion and usage.

Figure 1:
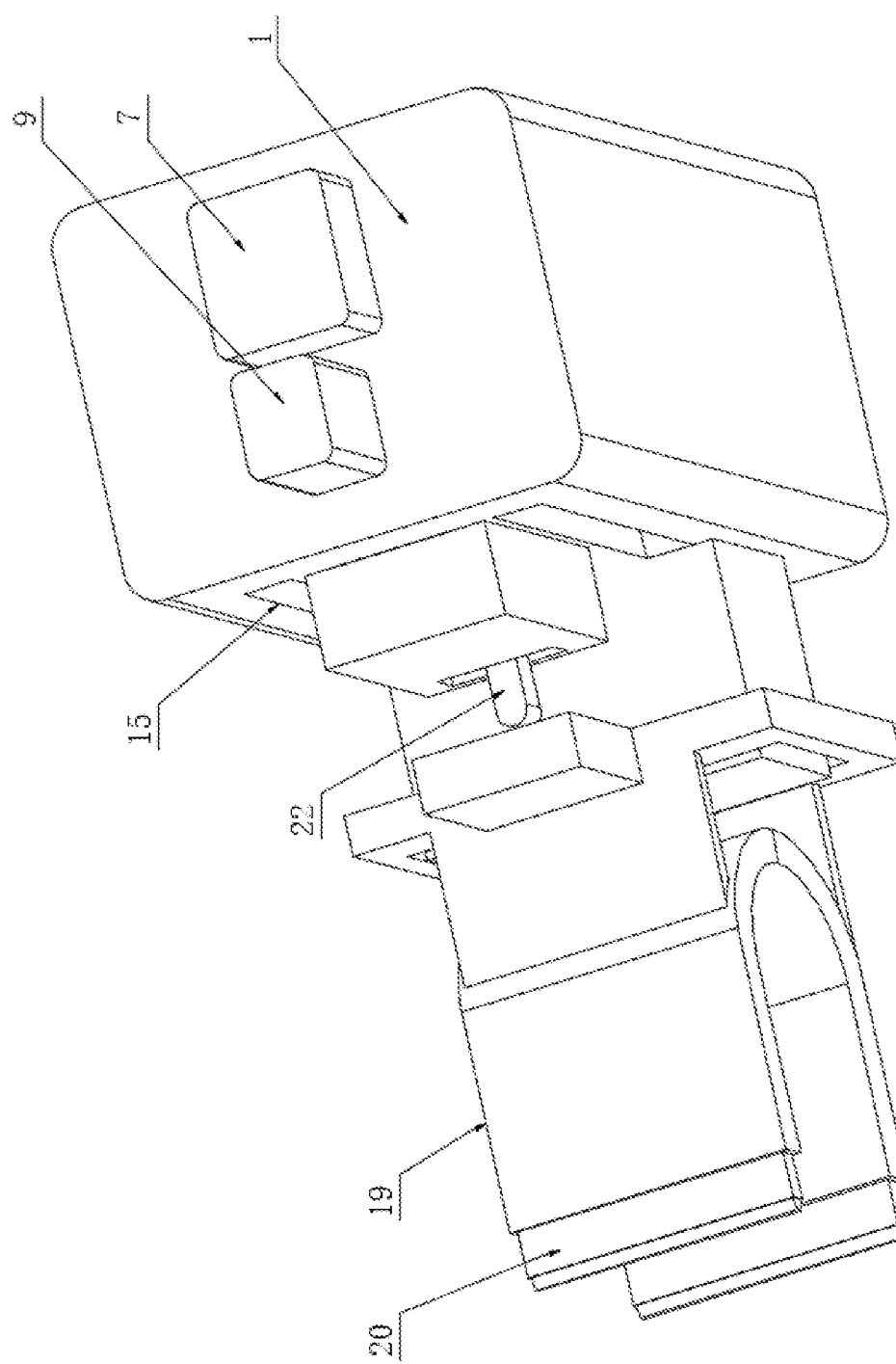
FIG. 1 is a perspective view of a snow shovel structure of a snow plow robot according to an embodiment of the present disclosure.
Figure 2:
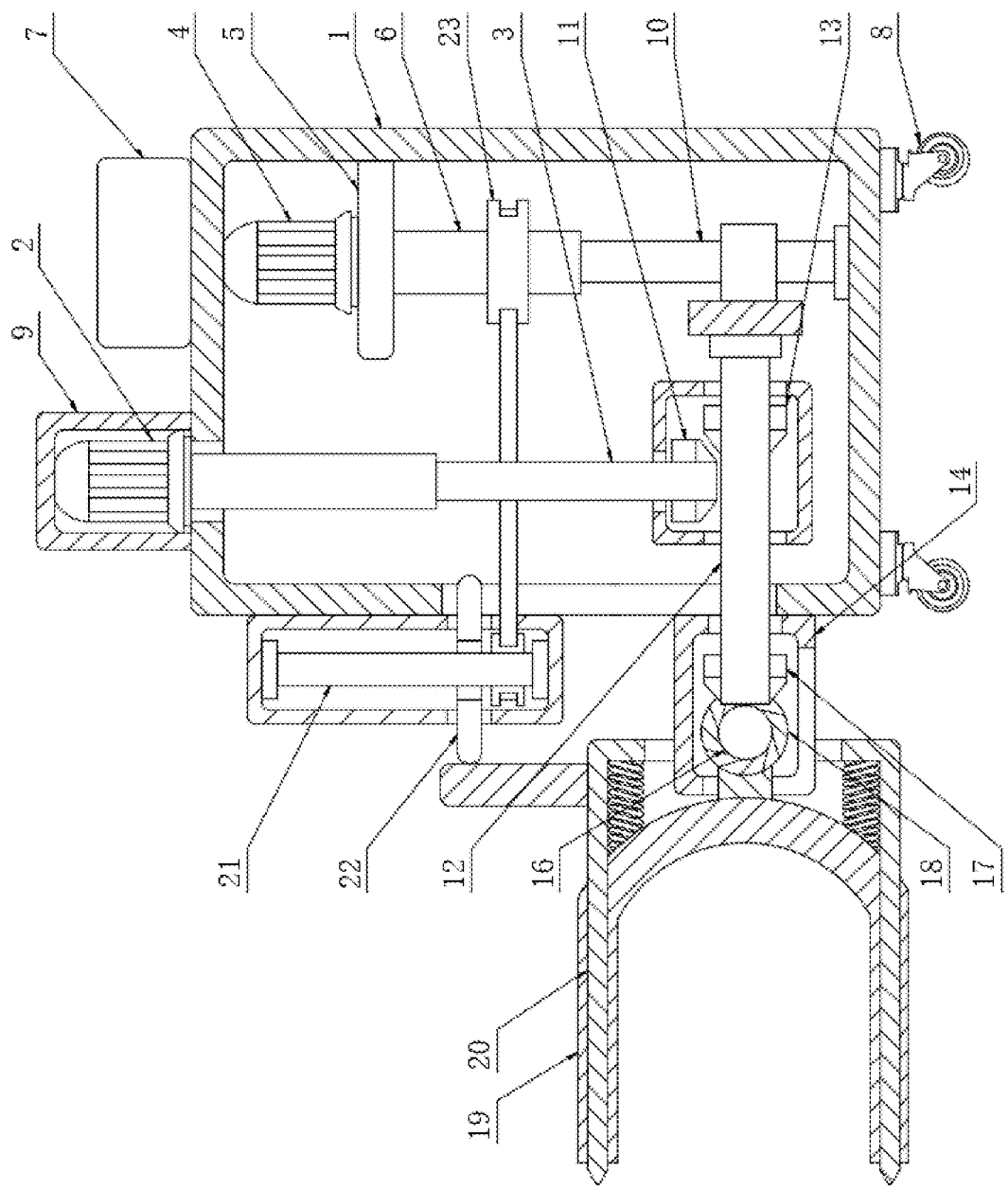
FIG. 2 is a schematic structural diagram of the snow shovel structure of the snow plow robot according to an embodiment of the present disclosure.
Figure 3:
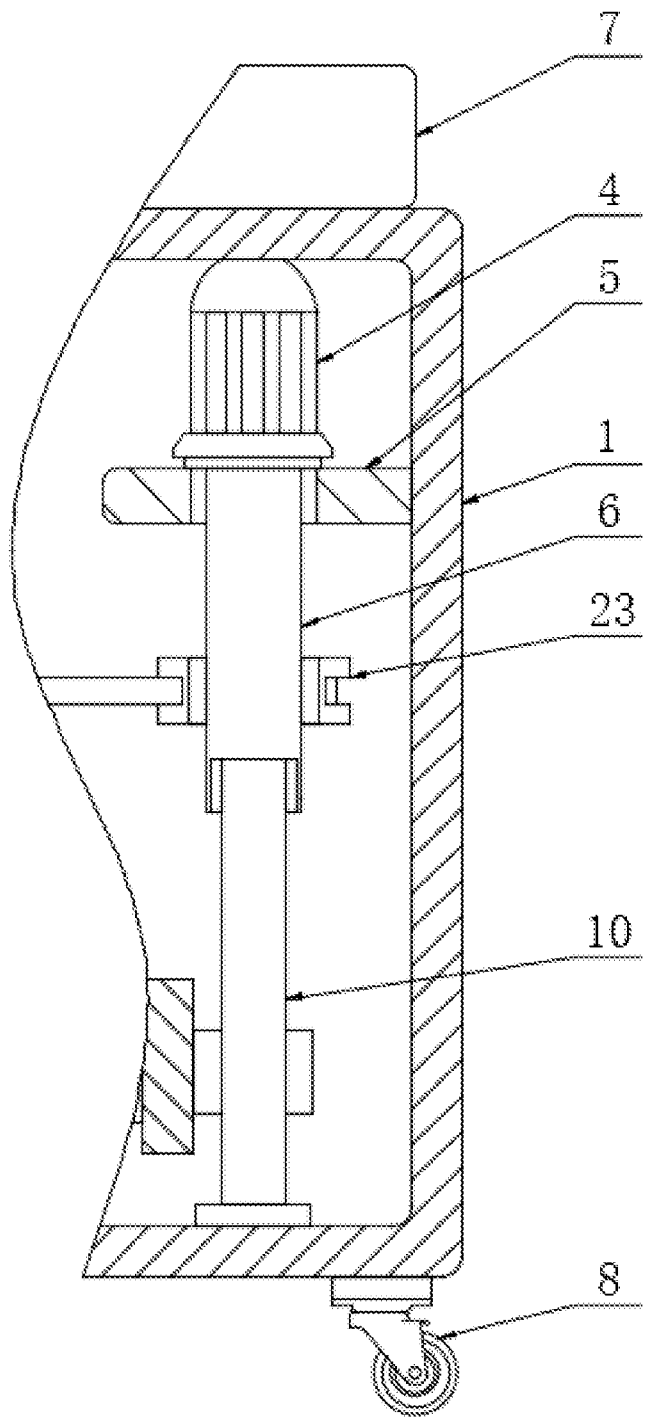
FIG. 3 is a front cross-segmental view of a first belt pulley in the snow shovel structure of the snow plow robot according to an embodiment of the present disclosure.
Figure 4:
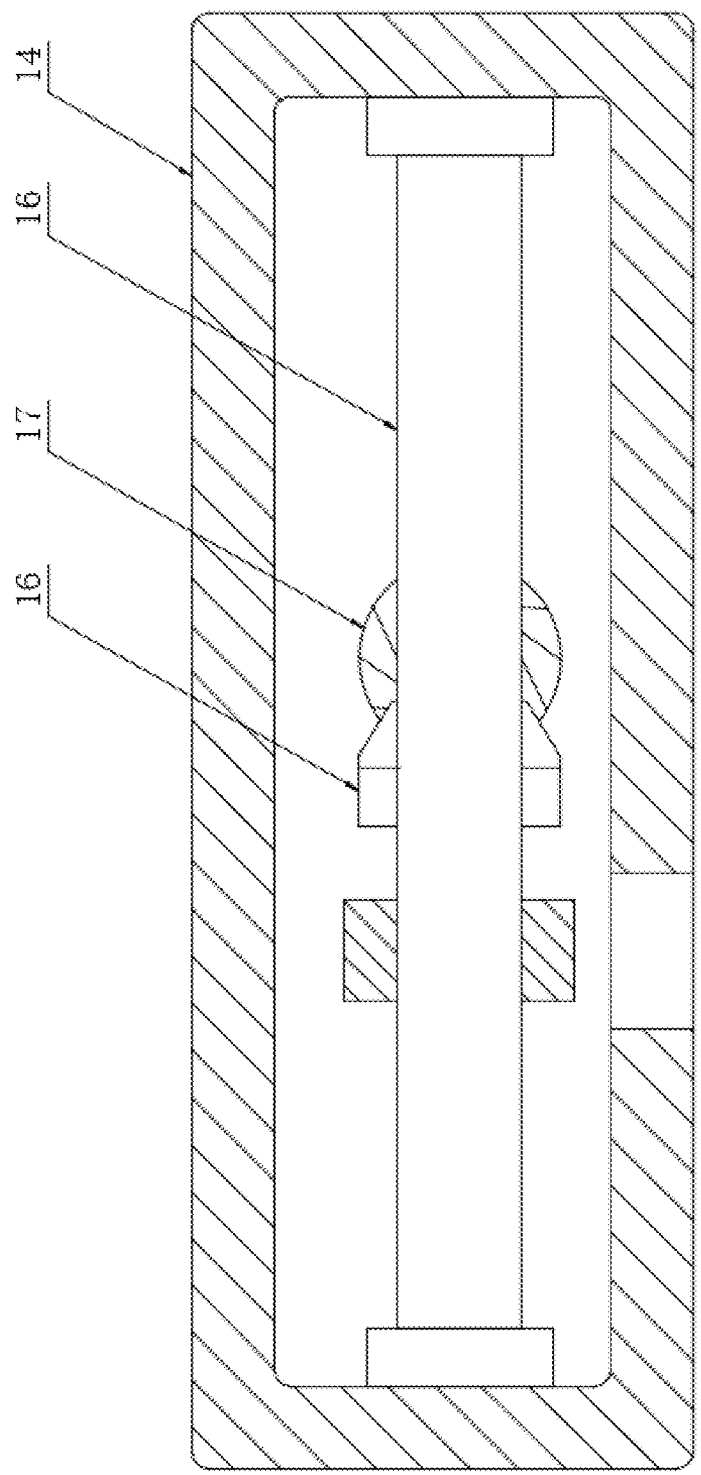
FIG. 4 is a side cross-segmental view of a third rotating rod of the snow shovel structure of the snow plow robot according to an embodiment of the present disclosure.

List of reference numbers: 1 housing; 2 first motor; 3 telescopic rod; 4 second motor; 5 horizontal plate; 6 first rotating rod; 7 battery; 8 universal wheel; 9 motor box; 10 reciprocating screw rod; 11 first bevel gear; 12 second rotating rod; 13 second bevel gear; 14 second gear box; 15 sliding groove; 16 third rotating rod; 17 third bevel gear; 18 fourth bevel gear; 19 snow shovel plate; 20 ice-breaking frame; 21 fourth rotating rod; 22 beating plate; 23 first belt pulley; and 24 trapezoidal plate.

DETAILED DESCRIPTION OF THE EMBODIMENTS

The preferred embodiments of the present disclosure will be described below with reference to the accompanying drawings. It is understood that the preferred embodiments described here are only used to illustrate and explain the present disclosure, rather than limiting the present disclosure.

In embodiment 1, with reference to FIGS. 1-4, a snow shovel structure of a snow plow robot according to the present disclosure includes a housing 1. A snow shovel mechanism is provided inside the housing 1 and extends out of the housing 1.

The snow shovel mechanism includes a first motor 2 fixed on a top portion of the housing 1 and fixedly connected with a telescopic rod 3 through an output shaft. A second motor 4 is further provided on a top portion of an inner chamber of the housing 1. A horizontal plate 5 is fixedly arranged on a side wall of the inner chamber of the housing 1. The second motor 4 is fixedly arranged on a top portion of the horizontal plate 5 and fixedly connected with a first rotating rod 6 through an output shaft. The first rotating rod 6 arranged on a rear side of the telescopic rod 3 is penetrated through the horizontal plate 5 and bearingly connected with the horizontal plate 5. The top portion of the housing 1 is further fixedly provided with a battery 7 arranged at a side of the first motor 2. The first motor 2 and the second motor 4 are electrically coupled with the battery 7, and a bottom portion of the housing 1 is fixed with four universal wheels 8.

The snow shovel mechanism further includes a protection component. The protection component includes a motor box 9. The motor box 9 is fixedly arranged on the top portion of the housing 1. And the first motor 2 is fixedly arranged inside the motor box 9.

Further, a reciprocating screw rod 10 is provided at a bottom portion of the inner chamber of housing 1. The reciprocating screw rod 10 is bearingly connected with the bottom portion of the inner chamber of housing 1. The reciprocating screw rod 10 is provided at a bottom portion of the first rotating rod 6. The reciprocating screw rod 10 is connected to the first rotating rod 6 by a one-way bearing. The reciprocating screw rod 10 is sheathed at an outside thereof with a bearing seat. The bearing seat is connected to the reciprocating screw rod 10 by a ball screw nut pair. A side of the bearing seat is fixed with a support plate. And the first rotating rod 6 drives the reciprocating screw rod 10 to rotate.

Further, the telescopic rod 3 is externally provided with a first gear box. A top portion of the first gear box is bearingly connected to the telescopic rod 3. The first gear box is provided with a second rotating rod 12. The second rotating rod 12 is penetrated through and bearingly connected with the first gear box. A rear end of the second rotating rod (12) is bearingly connected with the support plate. A first bevel gear 11 is fixedly provided outside the telescopic rod 3. A second bevel gear 13 is fixedly provided outside the second rotating rod 12. The second bevel gear 13 is arranged at a bottom portion of the first bevel gear 11 and meshed with the first bevel gear 11. The second bevel gear 13 drives the second rotating rod 12 to rotate.

Further, a side portion of the housing 1 which is opposite to the side wall is opened with a movable groove. A second gear box is provided at the side portion of the housing 1. The side portion of the housing 1 is further provided with two sliding grooves 15 provided on a front side and a rear side of the movable groove respectively. Two sliding blocks are fixedly arranged on a side of the second gear box 14 which is close to the housing 1 and arranged inside the two sliding grooves 15 respectively. The second rotating rod 12 is penetrated through both the movable groove and a side wall of the second gear box 14 which is close to the housing 1, and bearingly connected with the side wall of the second gear box 14. Two sliding blocks are provided inside the two sliding grooves 15, so that a position of the second gear box 14 is limited when moving up and down.

Further, a third rotating rod 16 is provided inside the second gear box 14. A front side end and a rear side end of the third rotating rod 16 are bearingly connected with a front side portion and a rear side portion of an inner chamber of the second gear box 14 respectively. A third bevel gear 17 is fixed outside the second rotating rod 12. A fourth bevel gear 18 is fixed outside the third rotating rod 16. And the fourth bevel gear 18 is arranged on a side of the third bevel gear 17 which is away from the housing 1 and meshed with the third bevel gear 17. The fourth bevel gear 18 drives the third rotating rod 16 to rotate.

Further, a snow shovel plate 19 is provided on a side of the second gear box 14 which is away from the housing 1. A top portion and a bottom portion of the snow shovel plate 19 are provided with cavities respectively. An ice-breaking frame 20 is provided outside the second gear box 14. A side of the ice-breaking frame 20 which is close to the housing 1 is opened with a through groove in which the second gear box 14 is provided. A top portion and a bottom portion of the ice-breaking frame 20 are both extended into the cavities and extended out of the cavities respectively. Two springs are fixed on a side of the snow shovel plate 19 which is close to the housing 1. And an end of each spring which is close to the housing 1 is fixedly connected with a side wall of an inner chamber of the ice-breaking frame 20 which is close to the housing 1. The ice-breaking frame 20 is configured to break up the frozen snow.

Further, the second gear box 14 is provided with an L-shaped groove. A side of the snow shovel plate 19 which is close to the housing 1 is fixedly provided with a connecting plate penetrated through the L-shaped groove and extended into the second gear box 14. And the third rotating rod 16 penetrates through and is fixedly connected to the connecting plate. The L-shaped groove supplies a space for a rotation of the connecting plate.

Further, a box body is fixedly provided on a side of the housing 1 which is opposite to the side wall fixed with the horizontal plate 5. A fourth rotating rod 21 is provided in the housing. A top portion and a bottom portion of the fourth rotating rod 21 are bearingly connected with a top portion and a bottom portion of the box body respectively. Two sides of the box body are provided with hole-slots respectively. A circular plate is provided outside the fourth rotating rod 21. A plurality of beating plates 22 are provided outside the circular plate. And a vertical plate is fixed on a top portion of the ice-breaking frame 20. The circular plate rotates to beat the vertical plate, and the vertical plate drives the ice-breaking frame 20 to beat the frozen snow.

Further, a first belt pulley 23 is provided outside the first rotating rod 6. The first belt pulley 23 is connected with the first rotating rod 6 through a one-way bearing. A second belt pulley is fixedly provided outside the fourth rotating rod 21. A belt is provided between the first belt pulley 23 and the second belt pulley. And the first belt pulley 23 and the second belt pulley are connected by the belt. The second belt pulley drives the fourth rotating rod 21 to rotate.

In the embodiment, the usage process is as follows. During usage, the first motor 2 and the second motor 4 are both charged with electricity by the battery 7 to work. In the case where the device is performing snow removal operation, because the first rotating rod 6 and the reciprocating screw rod 10 are connected by a one-way bearing, and the first belt pulley 23 and the first rotating rod 6 are connected by a one-way bearing, when the second motor 4 rotates forward, the first rotating rod 6 drives the reciprocating screw rod 10 to rotate, and the rotating rod 6 does not drive the first belt pulley 23 to rotate simultaneously. In turn, when the second motor 4 reversely rotates, the first rotating rod 6 drives the first belt pulley 23 to rotate, and the first rotating rod 6 does not drive the reciprocating screw rod 10 to rotate simultaneously.

When this device is working, firstly, in the case where the second motor 4 rotates forward, the second motor 4 drives the first rotating rod 6 to rotate, the first rotating rod 6 drives the reciprocating screw rod 10 to rotate, the reciprocating screw rod 10 drives the bearing seat to move, the bearing seat drives the supporting plate to move, the supporting plate drives the second rotating rod 12 to move, the second rotating rod 12 drives the second gear box 14 to move, the second gear box 14 drives the third rotating rod 16 to move, the third rotating rod 16 drives the connecting plate to move, and the connecting plate drives the snow shovel plate 19 to move. In this way, when the snow shovel plate 19 moves up or down to an appropriate location, the device can move forward for snow shoveling operation.

When encountering the frozen snow on road, it can be known from the above principles that, the second motor 4 starts to reversely rotate, the first rotating rod 6 drives the first belt pulley 23 to rotate, the first belt pulley 23 drives the belt to rotate, the belt drives the second belt pulley to rotate, the second belt pulley drives the fourth rotating rod 21 to rotate, the fourth rotating rod 21 drives the circular plate to rotate, the circular plate drives the beating plate 22 to rotate, the beating plate 22 is rotated to beat the vertical plate, and the vertical plate drives the ice-breaking frame 20 to move rapidly from left and right, so as to beat the ice to achieve a purpose of breaking the ice. When the snow is shoveled by the snow shovel plate 19 and filled the snow shovel plate 19, the first motor 2 starts to operate and drive the telescopic rod 3 to rotate, the telescopic rod 3 drives the first bevel gear 11 to rotate, the first bevel gear 11 drives the second bevel gear 13 to rotate, the second bevel gear 13 drives the second rotating rod 12 to rotate, the second rotating rod 12 drives the third bevel gear 17 to rotate, the third bevel gear 17 drives the fourth bevel gear 18 to rotate, the fourth bevel gear 18 drives the third rotating rod 16 to rotate, the third rotating rod 16 drives the connecting plate to rotate, and a rotation of the connecting plate drives the snow shovel plate 19 to rotate up or down reversely. It can be seen from the above connecting relationship that, when the first motor 2 in forward and reverse two different states, the snow shovel plate 19 finally is represented to be in two state of rotating upward and downward respectively. It can be seen from the above principles that, when the snow in the snow shovel plate 19 is full, the above opposite steps are repeated, so that the snow shovel plate 19 moves upward, and then rotates downward, so as to enable the snow to be poured out of the snow shovel plate, which fulfills a cleanup of the snow on the road.

Figure 5:
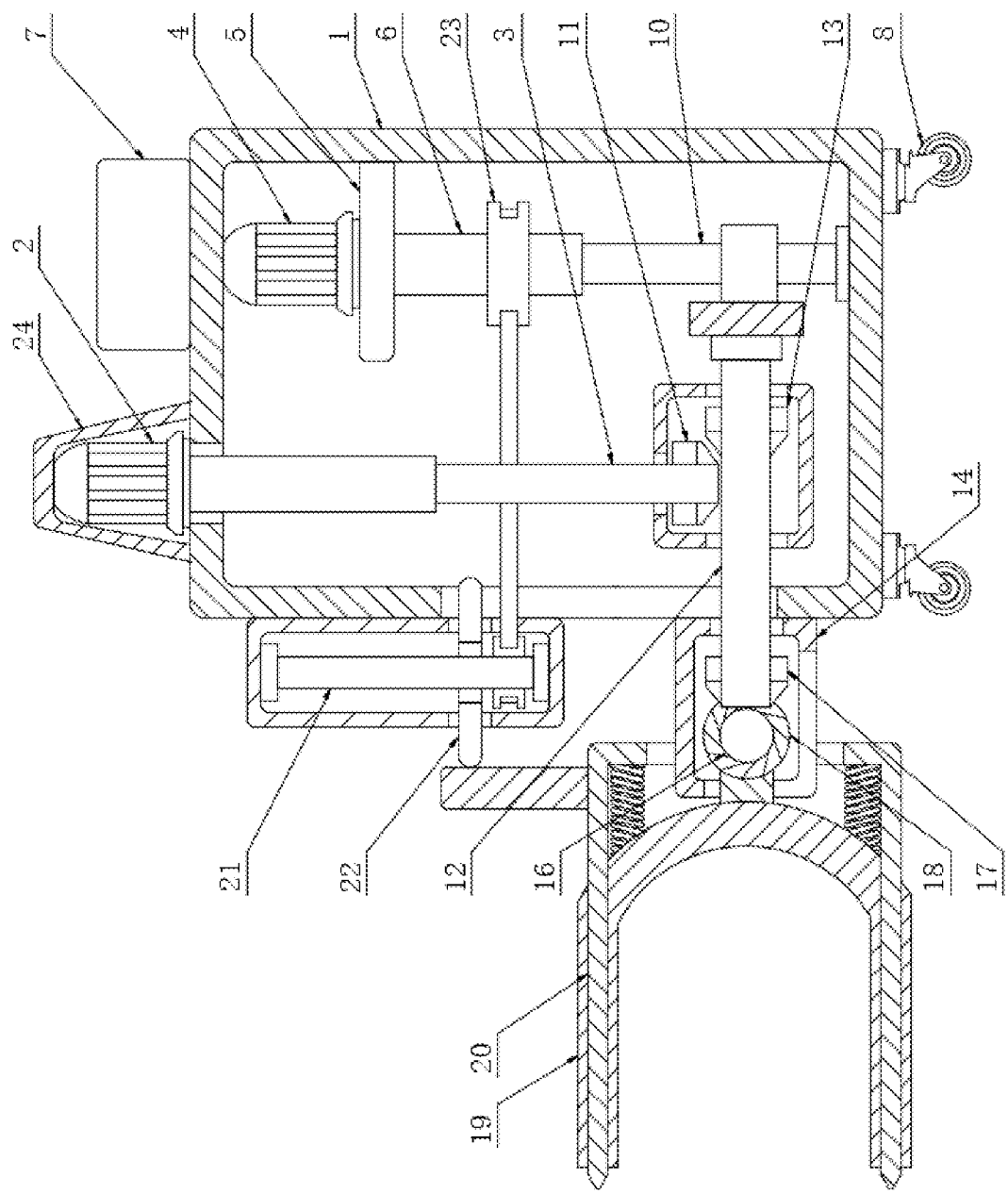
FIG. 5 is another schematic structural diagram of a snow shovel structure of a snow plow robot according to an embodiment of the present disclosure.

In embodiment 2, with reference to FIG. 5, the snow shovel structure of the snow plow robot according to the disclosure includes a trapezoidal plate 24 fixed on the top portion of the housing 1. The first motor 2 is fixedly arranged inside the trapezoidal plate 24.

In the embodiment, the usage process is as follows. During usage, the first motor 2 and the second motor 4 are both charged with electricity by the battery 7 to work. In the case where this device is performing snow removal operation, because the first rotating rod 6 and the reciprocating screw rod 10 is connected by a one-way bearing, and the first belt pulley 23 and the first rotating rod 6 are connected by a one-way bearing, when the second motor 4 rotates forward, the first rotating rod 6 drives the reciprocating screw rod 10 to rotate, and the rotating rod 6 does not drive the first belt pulley 23 to rotate simultaneously. In turn, when the second motor 4 reversely rotates, the first rotating rod 6 drives the first belt pulley 23 to rotate, and the first rotating rod 6 does not drive the reciprocating screw rod 10 to rotate simultaneously. When this device is working, firstly, in the case where the second motor 4 rotates forward, the second motor 4 drives the first rotating rod 6 to rotate, the first rotating rod 6 drives the reciprocating screw rod 10 to rotate, the reciprocating screw rod 10 drives the bearing seat to move, the bearing seat drives the supporting plate to move, the supporting plate drives the second rotating rod 12 to move, the second rotating rod 12 drives the second gear box 14 to move, the second gear box 14 drives the third rotating rod 16 to move, the third rotating rod 16 drives the connecting plate to move, and the connecting plate drives the snow shovel plate 19 to move. In this way, when the snow shovel plate 19 moves up or down to an appropriate location, the device can move forward for snow shoveling operation. When encountering the frozen snow on road, it can be known from the above principles that, the second motor 4 starts to reversely rotate, the first rotating rod 6 drives the first belt pulley 23 to rotate, the first belt pulley 23 drives the belt to rotate. During the working process of this device, the trapezoidal plate 24 can provide safe and solid protection and support for the first motor 2, as well as further provide a good space for heat dissipation for the first motor 2 since it does not have a sealed space.

Accordingly, it is noted that the above embodiments are only used to illustrate the technical solution of the present disclosure and not to limit it. Although the disclosure is described in detail with reference to the preferred embodiments, it should be understood by those of ordinary skill in the art that the technical solution of the disclosure can be modified or substituted in an equivalent manner without departing from the purpose and scope of the technical solution of the disclosure, which shall be covered by the scope of the claims of the disclosure.

What is claimed is:

1. A snow shovel structure of a snow plow robot, the snow shovel structure comprising a housing, wherein a snow shovel mechanism is provided inside the housing and extends out of the housing, the snow shovel mechanism comprises a first motor fixed on a top portion of the housing and fixedly connected with a telescopic rod through an output shaft, a second motor is further provided on a top portion of an inner chamber of the housing, a horizontal plate is fixedly arranged on a side wall of the inner chamber of the housing, the second motor is fixedly arranged on a top portion of the horizontal plate and fixedly connected with a first rotating rod through an output shaft, the first rotating rod arranged on a rear side of the telescopic rod penetrates through the horizontal plate and is connected with the horizontal plate through a first bearing, the top portion of the housing is further fixedly provided with a battery arranged at a side of the first motor, the first motor and the second motor are electrically coupled with the battery, and a bottom portion of the housing is fixedly with four universal wheels;

the snow shovel mechanism further comprises a protection component, the protection component comprises a motor box fixedly arranged on the top portion of the housing, and the first motor is fixedly arranged inside the motor box.

2. The snow shovel structure of the snow plow robot according to claim 1, wherein a bottom portion of the inner chamber of the housing is provided with a reciprocating screw rod, the reciprocating screw rod arranged at a bottom portion of the first rotating rod is connected with the bottom portion of the inner chamber of the housing through a second bearing, the reciprocating screw rod and the first rotating rod are connected through a first one-way bearing, the reciprocating screw rod is sheathed at an outside thereof with a bearing seat connected to the reciprocating screw rod through a ball screw nut pair, and a support plate is fixed on a side of the bearing seat.

3. The snow shovel structure of the snow plow robot according to claim 2, wherein a first gear box is provided outside the telescopic rod; a top portion of the first gear box is connected to the telescopic rod through a third bearing, the first gear box is provided with a second rotating rod penetrating through and connected with the first gear box through a fourth bearing, a rear end of the second rotating rod is connected with the support plate through a sixth bearing; a first bevel gear is fixedly provided outside the telescopic rod, a second bevel gear is fixedly provided outside the second rotating rod; the second bevel gear is arranged at a bottom portion of the first bevel gear and meshed with the first bevel gear.

4. The snow shovel structure of the snow plow robot according to claim 1, wherein a side portion of the housing which is opposite to the first side wall is opened with a movable groove, a second gear box is provided at the side portion of the housing, the side portion of the housing is further provided with two sliding grooves provided on a front side and a rear side of the movable groove respectively, two sliding blocks are fixedly arranged on a side of the second gear box which is close to the housing and arranged inside the two sliding grooves respectively, the second rotating rod penetrates through both the movable groove and a side wall of the second gear box, which is close to the housing and is connected with the side wall of the second gear box through a seventh bearing.

5. The snow shovel structure of the snow plow robot according to claim 4, wherein a third rotating rod is provided inside the second gear box, a front side end and a rear side end of the third rotating rod are connected with a front side portion and a rear side portion of an inner chamber of the second gear box respectively through a eighth bearing and a ninth bearing, a third bevel gear is fixed outside the second rotating rod, a fourth bevel gear (18) is fixed outside the third rotating rod, and the fourth bevel gear is arranged on a side of the third bevel gear which is away from the housing and meshed with the third bevel gear.

6. The snow shovel structure of the snow plow robot according to claim 4, wherein a snow shovel plate is provided on a side of the second gear box which is away from the housing, a top portion and a bottom portion of the snow shovel plate are provided with cavities respectively, an ice-breaking frame is provided outside the second gear box, a side of the ice-breaking frame is opened with a through groove in which the second gear box is provided, a top portion and a bottom portion of the ice-breaking frame are both extended into the cavities and extended out of the cavities respectively, two springs are fixed on a side of the snow shovel plate which is close to the housing, and an end of each spring which is close to the housing is fixedly connected with a side wall of an inner chamber of the ice-breaking frame which is close to the housing.

7. The snow shovel structure of the snow sweeping robot according to claim 5, wherein the second gear box is provided with an L-shaped groove, a side of the snow shovel plate which is close to the housing is fixedly provided with a connecting plate penetrating through the L-shaped groove and extending into the second gear box, and the third rotating rod penetrates through and is fixedly connected to the connecting plate.

8. The snow shovel structure of the snow sweeping robot according to claim 6, wherein a box body is fixedly provided on a side of the housing which is opposite to the side wall fixed with the horizontal plate, a fourth rotating rod is provided in the housing, a top portion and a bottom portion of the fourth rotating rod are connected with a top portion and a bottom portion of the box body respectively through a tenth bearing and a eleventh bearing, two sides of the box body are provided with slots respectively, a circular plate is provided outside the fourth rotating rod, a plurality of beating plates are provided outside the circular plate, and a vertical plate is fixed on a top portion of the ice-breaking frame.

9. The snow shovel structure of the snow plow robot according to claim 8, wherein a first belt pulley is provided outside the first rotating rod, the first belt pulley is connected with the first rotating rod through a second one-way bearing, a second belt pulley is fixedly provided outside the fourth rotating rod, a belt is provided between the first belt pulley and the second belt pulley, and the first belt pulley and the second belt pulley are connected by the belt.

10. The snow shovel structure of the snow plow robot according to claim 1, wherein the protection component further comprises a trapezoidal plate fixed on the top portion of the housing, and the first motor is fixedly arranged inside the trapezoidal plate.

\* \* \* \* \*